F. L. O. WADSWORTH.
BEARING.
APPLICATION FILED JUNE 19, 1918.
1,437,788. Patented Dec. 5, 1922.
2 SHEETS—SHEET 1.
Fig. 1.
Fig. 2.
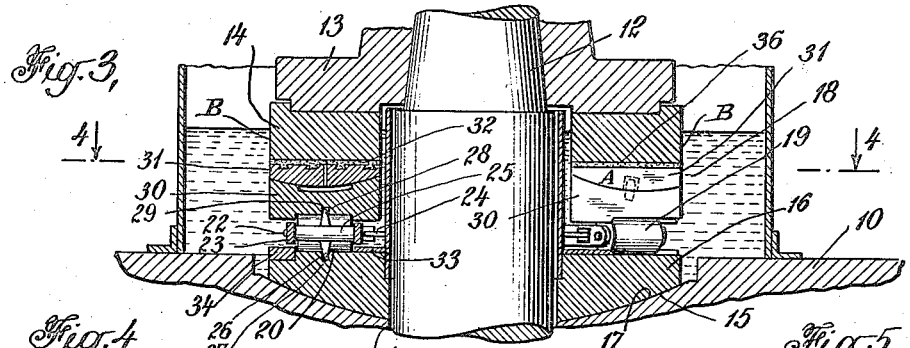
Fig. 3.
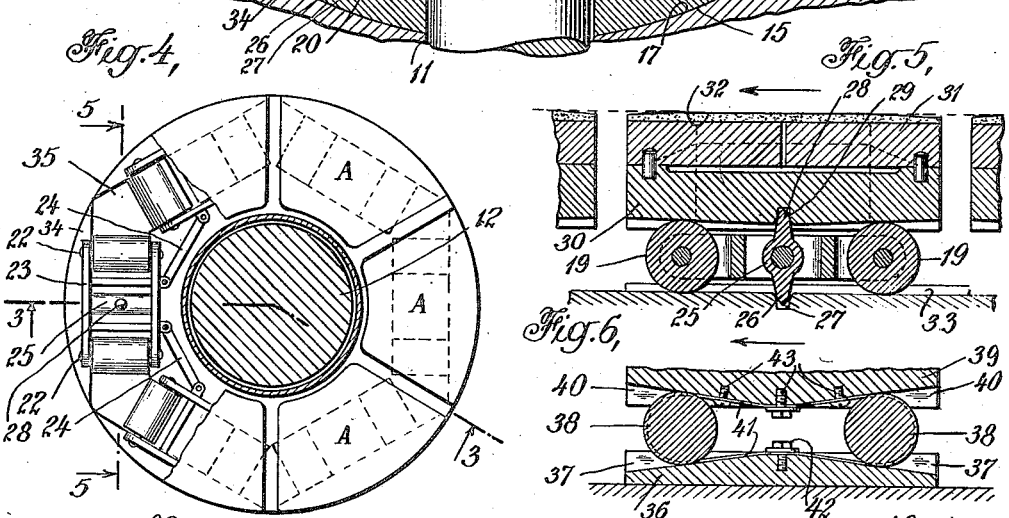
Fig. 4.
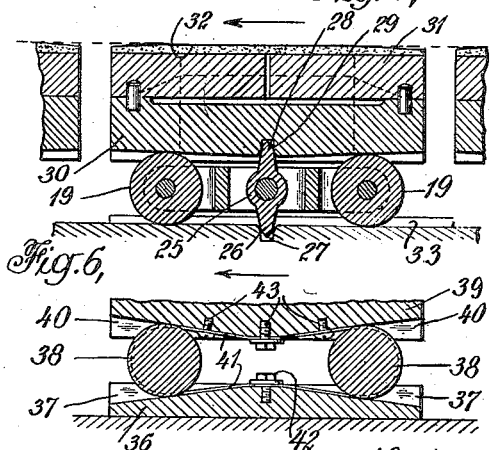
Fig. 5.
Fig. 6.
Fig. 7.
Fig. 8.
Fig. 9.
Fig. 10.
INVENTOR.
F. L. O. Wadsworth
BY
Marshall & Dearborn
ATTORNEYS F. L. O. WADSWORTH.
BEARING.
APPLICATION FILED JUNE 19, 1918.
1,437,788.
Patented Dec. 5, 1922.
3 SHEETS—SHEET 2.
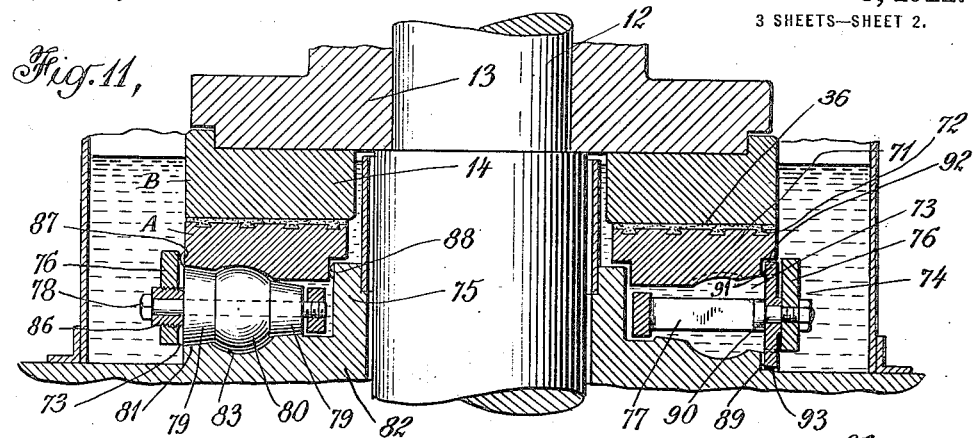
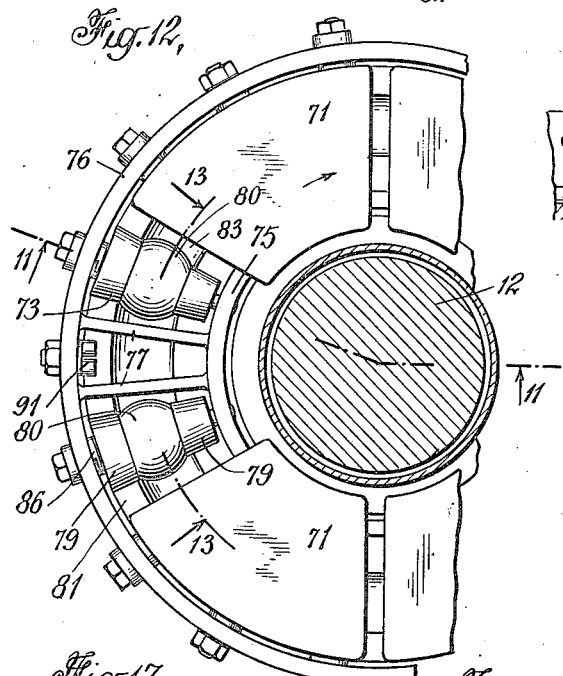
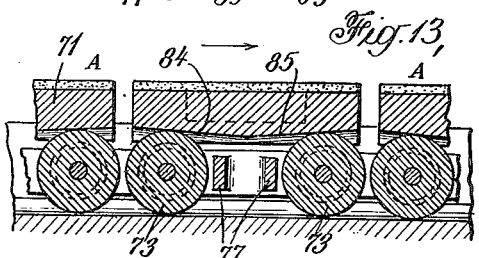
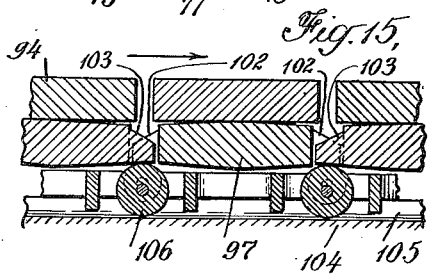
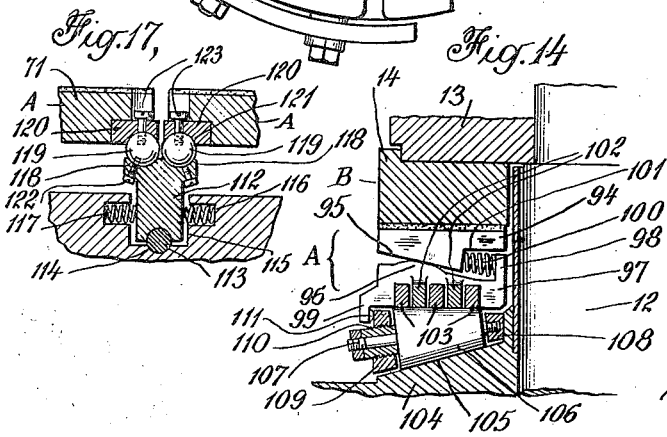
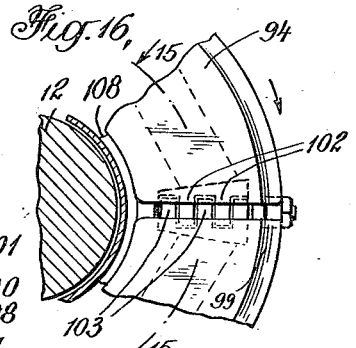
INVENTOR
F. L. O. Wadsworth
BY
Marshall & Dearborn
ATTORNEYS

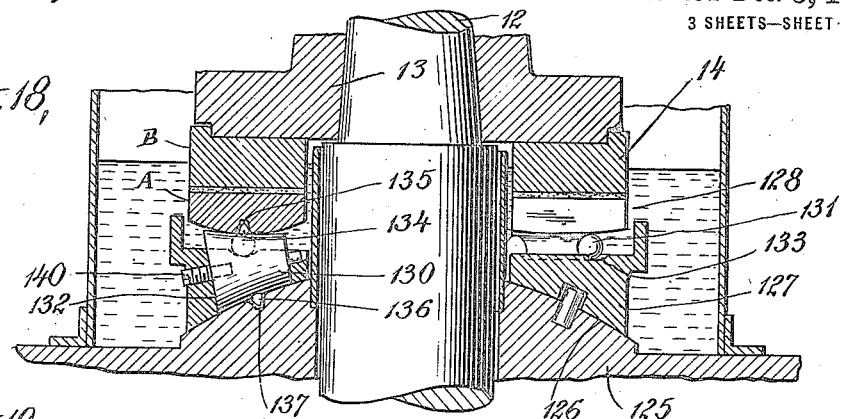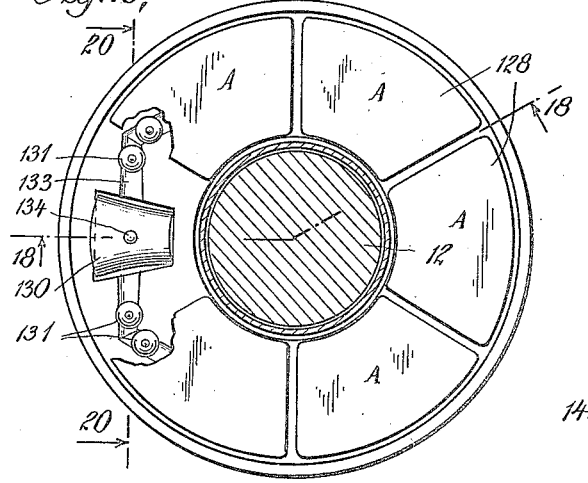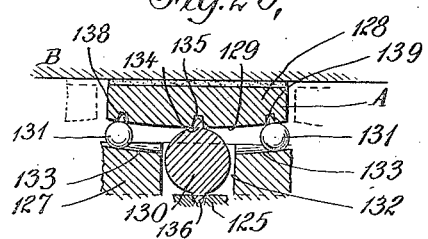

Patented Dec. 5, 1922.

1,437,788

UNITED STATES PATENT OFFICE.

FRANK L. O. WADSWORTH, OF PITTSBURGH, PENNSYLVANIA, ASSIGNOR TO ALBERT KINGSBURY, OF PITTSBURGH, PENNSYLVANIA.

BEARING.

Application filed June 19, 1918. Serial No. 240,761.

*To all whom it may concern:*

Be it known that I, FRANK L. O. WADSWORTH, a citizen of the United States of America, and a resident of Pittsburgh, Allegheny County, and State of Pennsylvania, have invented certain new and useful Improvements in Bearings, of which the following is a specification, reference being had to the accompanying drawings, forming a part thereof.

My invention relates to bearings, and more particularly to bearings, such as thrust bearings, of the character which are generally known as the Kingsbury rocking shoe or flexible segment type, in which one or more annularly arranged bearing segments are so mounted as to be capable of assuming—independently or conjointly—tilted positions with respect to the bearing surface of the cooperating bearing member; thereby producing, when in action, a corresponding series of wedge-shaped oil-filled openings between the moving surfaces and preventing the latter from coming into metallic engagement with each other.

The invention pertains particularly to the supports or mounts on which the bearing segments or shoes are disposed.

One object of my invention is to provide an improved bearing structure of the Kingsbury type in which the starting friction, which is usually high as compared to the running friction, shall be materially lessened and the amount of movement between the relatively rotatable bearing members, before the oil film is automatically established at their cooperating surfaces, reduced to a very small angle.

Another object of my invention is to provide a bearing in which the bearing segments are so mounted that the tendency of said segments to tilt in a direction opposite to that necessary for the proper formation of the wedge-shaped oil films, owing to the drag of the opposed bearing member on said segments when relative movement of the parts is initiated, is overcome.

Another object of my invention is to provide a bearing in which the bearing segments are so mounted that the tendency of said segments to lift or otherwise move the opposed bearing member during the act of tilting is reduced to any desired extent.

The particular purpose of my invention—as hereinafter more fully described—is to provide a form of mounting for the segmental bearing elements which will permit them to assume, easily and quickly, the desired tilted positions as soon as the bearing parts begin to move, and which will thereby facilitate the immediate formation of the wedge-shaped oil films that are characteristic of the normal and intended operation of this type of bearing construction.

In order that my invention may be thoroughly understood, I will now proceed to describe the same in the following specification, and will then point out the novel features thereof in appended claims.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring to the drawings:

Figures 1 and 2 are diagrams, illustrating in Figure 1 a bearing shoe as ordinarily supported, and in Figure 2 a bearing shoe arranged and supported in accordance with my invention.

Figure 3 is a sectional elevation, taken on the line 3—3 of Figure 4, of a thrust bearing constituting an embodiment 20 of my invention.

Figure 4 is a partially sectional plan view of the same bearing with certain of the shoes broken away to show the supports.

Figure 5 is a sectional elevation on the line 5—5 of Figure 4, but drawn to a larger scale.

Figures 6, 7, 8 and 9 are views corresponding to Figure 5, showing various structures which also embody my invention.

Figure 10 is a transverse or radial section showing a slight variation of the arrangement shown in Figure 8.

Still another embodiment of my invention is shown in Figure 11 which is a sectional elevation taken on the line 11—11 of Figure 12.

Figure 12 is a partially sectional plan view of the same bearing with one of the shoes removed.

Figure 13 is a circumferential section taken on the line 13—13 of Figure 12 and developed into a single plane.

Figure 14 is a partially sectional elevation of a bearing constituting another embodiment of my invention.

Figure 15 is a view of the same bearing and corresponding to Figure 13, taken on the line 15—15 of Figure 16.

Figure 16 is a partial plan view of the same bearing.

Figure 17 is a detail view of a slight variation of the arrangement shown in Figure 15.

Another embodiment of my invention is shown in Figure 18, which is a sectional elevation corresponding to Figure 11, taken on the line 18—18 of Figure 19.

Figure 19 is a sectional plan view with certain of the shoes removed or broken away to disclose the support.

Figure 20 is a sectional view on line 20—20 of Figure 19.

Figure 21 is a sectional elevation of a further embodiment of my invention.

Figure 22 is a sectional plan view taken on the line 22—22 of Figure 21.

Figure 23 is a sectional elevation taken on the line 23—23 of Figure 22.

The general object of the present invention—and the main basic feature of the various embodiments thereof which are herein illustrated and described—will be most clearly understood by referring to the diagrams of Figures 1 and 2 of the drawings. In these diagrams A represents one of the segmental bearing shoes or elements, which is supposed to be in operative engagement with a cooperating thrust surface B. When the bearing is at rest the end thrust or static load on the engaging members presses the bearing surfaces of those members into parallelism with each other, and soon forces them into intimate physical contact. This establishes a high static coefficient of frictional resistance to movement, which makes these bearings "start hard", as it is termed; and tends to prevent the introduction of lubricant between the closely adjacent surfaces of thrust bearing engagement. In the ordinary construction of the "rocking shoe" type of bearing the pivoted or flexible segments are mounted to rock or flex about an axis that is behind or beyond the surface of bearing engagement when the latter is viewed from the direction of the end thrust; or—as shown in Figure 1—below the bearing surface of the shoe. The movement of the cooperating thrust surface in either direction relatively to the shoe surface—as to the left in the direction of the main arrow of Figure 1—tends to "drag" the shoe surface in the same direction, and correspondingly tilt or rock the shoe member as a whole in such manner that the forward or advanced edge of the latter is lifted and the back or rearward edge thereof is depressed. But this is exactly the reverse of the direction in which the shoe member must tilt in order to form the wedge-shaped oil film that characterizes the proper and intended action of this flexible segment type of construction; and the tilting members will not therefore assume their desired inclined positions until the speed has become so high that the action of the moving surface in drawing the adherent oil into the spaces between the thrust member and the shoes—and thus wedging down the advanced edges of the latter—is sufficient to counteract and overcome the frictional drag of the surfaces themselves on each other. In this form of construction therefore the tilting shoes must (in order to form the desired wedge-shaped oil openings) rock or move against the direction of relative movement of the engaging thrust surfaces—as indicated by the dotted lines and corresponding minor arrows of Figure 1— and in so moving act against the rotative frictional drag of the one member on the opposed member. These opposed tendencies interfere, of course, with the desired tilting movements of the bearing segments and the consequent formation of the wedge shaped oil "flotation" films.

My invention or improvement is directed to the entire elimination of these opposing actions on the pivoted or flexibly supported bearing segments; and to the provision of such a form of mounting therefor as will permit the said segments to move with the cooperating bearing surfaces—instead of in opposition thereto—in assuming the tilted positions necessary for the establishment and maintenance of the oil "flotation" films. In order to accomplish this object the tiltable bearing segment A is arranged to move rearwardly—i. e. in the direction of rotation—and its forward edge tilt downwardly or away from the cooperating thrust surface B as the opposed bearing member starts from rest. If, for example, the latter is moving to the left relatively to the segment A (as indicated by the main arrow of Figure 2) the said segment is so supported that it will also move bodily to the left and tilt or rock clockwise—the relation of these two movements of translation and rotation being indicated by the minor arrows of the second diagram, in which the full and dotted lines indicate respectively the positions occupied by the shoe segment, A, when the bearing is at rest and in operation. It is obvious that the adhesion of the two engaging thrust surfaces, and the consequent frictional "drag" of the moving member on the relatively stationary member, will, under such circumstances, tend to move the shoe segment into its proper tilted position, as soon as the bearing parts start from their position of rest; and will, therefore, result in the immediate and positive formation of the desired wedge-shaped oil openings between the shoes and opposed bearing member, independently of any oil wedging action between the relatively moving surfaces.

The tilting of the segmental bearing element, A, about any axis that is beyond or below the plane of bearing engagement—as shown in the diagram of Figure 1—necessarily lifts the rearward edge of the segment, and correspondingly moves the cooperating surface of the thrust member B away from the point of support for the shoe. This movement is resisted or opposed by the load, or the end thrust, on the bearing surfaces—which is directed toward the point of support—and in tilting the shoes must, therefore, act against this end thrust or pressure which tends to maintain the surfaces in parallelism. A further object of my invention is to reduce—or, if desired, substantially eliminate—the effect of the end thrust in opposing the tilting movements of the shoe members. I accomplish this by so mounting these members that in their rearward movement of translation—from the full line to the dotted line positions of Figure 2—the central element, $a$, of the segmental bearing surface may move downwardly as well as backwardly (as for example to the point $a''$), thereby correspondingly diminishing, or even entirely eliminating, the upward movement of the rear edge of the tilted shoe, and the consequent lifting, or endwise movement, of the opposed bearing surface.

My invention then is directed primarily to the practical elimination of the effect of the frictional "drag" of the moving parts in retarding or preventing the tangential tilting of the segmental bearing elements, and to the converse utilization of that "drag" in assisting and producing such tilting; and is further directed, secondarily, to the partial or complete elimination of the effect of the end thrust or load in resisting the desired rocking movement of the said segments. It is not, however, generally desirable to entirely eliminate the last-named effect, because it is usually preferable to utilize a component part of the end thrust to restore the segmental bearing surfaces, A, to their initial position of parallelism with the opposing surface B, when the bearing is at rest.

Various forms of mechanical construction, illustrative of embodiments of my invention in thrust bearing structures, will now be described in greater detail.

In the form shown in Figures 3, 4 and 5, 10 designates the base having an opening 11 through which a shaft 12 extends. A thrust block 13 is secured to the shaft and has a thrust collar 14 attached to it. The base 10 is provided with a spherical recess 15 on which an equalizer ring 16 is seated, the ring being provided with a spherical surface 17 to cooperate with the surface 15 of the base, and on said ring 16 plurality of bearing shoes or segmental bearing members 18 are mounted in cooperative relation with the bearing surface of said collar.

In the form of mounting here shown, the segmental bearing members are mounted on cylindrical rollers 19 which roll or rock on the plane upper surface of the equalizing ring 16. Said rollers 19 are arranged in pairs and are axially pivoted on transverse pins 22 which form parts of a series of cages or frames 23, two of the rollers being associated with each frame, and the several frames being shown as interconnected by links 24. The arrangement of parts is such that the frames and the rollers are circumferentially disposed about the shaft and are preferably, although not essentially, interconnected so that their movement is substantially equal and concurrent.

Centrally pivoted on each of the frames 23 is a pawl 25 which is formed at one end into a tooth 26 extending downwardly into a suitable tooth cavity 27 in the equalizer ring 16 and at its opposite end into a tooth 28 which extends upwardly into a suitable recess 29 in the bottom of the corresponding shoe.

Each of the shoes 18 is here shown as constructed in two parts, a bottom part 30 which is provided with the notch or recess 29, and a top part 31 which has a cylindrical bottom surface seated on the correspondingly curved upper surface of the bottom part so that it is free to tilt radially or transversely to adjust itself and equalize the pressure upon all portions of its bearing surface 32.

The bottom surface of the part 30 is longitudinally beveled in opposite directions from its center as clearly shown in Figure 5, so that said surface inclines upwardly away from the recess 29 on each side of the center to provide inclined roller-engaging surfaces.

Each of the groups of rollers 19 are held in position on the equalizer ring 16 by strips 33 and 34 which are secured to the equalizer ring 16 and form a polygonal track or guideway 35 having as many sides as there are shoes, six being shown in the structure illustrated.

Assuming that the parts are at rest in their central positions, each section of the cage or frame occupying a position corresponding to that shown in Figure 5,—if the rotatable member is started in the direction of the arrow in Figure 5, the frictional drag between the surface of each shoe 32 and the cooperating surface 36 of the thrust collar 14 causes the shoes to start to move with the rotatable member and to roll on the rollers 19 for a short distance on the equalizer ring. As each shoe rolls on its supporting rollers, its position changes from the one shown in full lines in Figure 2 to the one shown in broken lines with the surface center $a'$, because the beveled bottom surface of the shoe is sufficiently inclined to cause the leading end of the shoe to be lowered and its trailing end to be raised. In effect then, each segment moves bodily substantially about an axis in front of the surface of bearing engagement when viewed from the direction of end thrust, or in the form shown an axis above the bearing surface of the segment. The automatic formation of a lubricating film between the bearing surfaces is thus very greatly facilitated.

It is therefore evident that the effect of the drag in this arrangement is utilized advantageously to facilitate the desired tilting of the shoe and automatically establish a lubricating film, but the tendency of the thrust pressure is to oppose the tilting of the shoes because the trailing end of each shoe is elevated. However, in the embodiment of my invention, as hereinafter described, I may arrange the supports in such manner as to tilt the shoe by lowering the forward end of the shoe without elevating the rear end and thus practically eliminate all opposition to the normal oil-wedge tilting of each shoe.

If the beveled surfaces on the lower face of the shoe member 30 are symmetrically inclined and positioned with respect to the top bearing face the downward movement of the forward or leading edge of the shoe will be equal to the upward movement of the rear or trailing edge; and the tilting movements of each shoe will be uniform and symmetrical for either direction of rotation. But if the two beveled portions of the lower roller-engaging surface are differently inclined to the top face, then the lifting effect on the trailing edge may be made less than the lowering effect on the leading edge of the shoe; and, in such cases, the secondary object of my improvement may be attained for one direction of shaft rotation.

The action of the above described two point mounting for the segmental bearing members—in permitting and securing a longitudinal movement of the shoe and a concurrent tangential tilting thereof—will be the same regardless of whether the cylindrical rollers 19 act as rolling supports or as fixed supports. But the tilting movements of the shoes are very small—as the difference in the thickness of the two ends of the wedge-shaped oil films is only a few thousandths of an inch—while it is desirable that the longitudinal movement of the shoes should be relatively large, i. e., at least twenty to thirty times as great as the elevation or depression of the rearward and the forward edges or ends of the bearing segments. In order to secure this relation or ratio of longitudinal and tilting movements the inclination of the roller engaging surfaces to the thrust bearing surfaces of the shoes must be extremely small; and if the roller members, 19, were fixed—so as to form sliding supports for the shoe members—the frictional resistance to the longitudinal movement of the bearing segments would be so great as to seriously interfere with the desired action of the parts in starting; and would probably prevent the return of the tilted bearing shoes to the initial position of parallelism with the opposed thrust member when the rotary movement was stopped. The provision of some form of very freely moving, anti-friction support system—such as a roller bearing or its equivalent—for the longitudinally movable shoe members is, therefore, an important practical feature of the constructions embodying my invention. It is also very desirable that the support system and the shoes carried thereby should be mechanically so connected as to prevent any accidental displacement of the cooperating elements and thus interfere with the true rolling movement of the parts with respect to each other. In the construction illustrated in Figures 3—5, this last object is attained by the pawls 25 which, as above indicated, have conical teeth—of involute or epicycloidal cross-section—that engage snugly with the correspondingly shaped gear tooth cavities located respectively in the lower faces of the shoe members 30 and the upper face of the equalizer ring 16.

Another form of support is shown in Figure 6, and comprises for each shoe a rail or guide block 36 having oppositely inclined tracks or guideways 37 in which a pair of rollers 38 are mounted. The bottom surface of the shoe 39 is provided with corresponding oppositely inclined tracks or guideways 40 and the proper relation between the rollers is maintained in this case by a flexible belt 41 which may be formed of a steel band or ribbon and is affixed to the center of the guide block 36 by a bolt 42 and to the bottom of the shoe by bolts 43. The guideways or tracks may be symmetrically inclined in opposite directions from the center and the tilting movement of each shoe, which results from the longitudinal rolling movement of the parts on each other, may be determined and controlled by the relation between the opposing inclinations of the inclined surfaces on the lower face of the shoe 39 and on the upper face of the guide block 36.

In the form shown in Figure 7 the bearing comprises shoes 44, each of which is provided with an oppositely inclined guideway 45 that corresponds to the guideway 40 but cooperates with rockers 46 instead of the rollers 38. The rockers 46 are joined by a flexible band 47 which is secured at its ends by bolts 48 to the respective rockers and is affixed to the bottom of the shoe by a bolt 49. The rockers have cylindrical supporting pivots 50 which fit into suitable sockets 51 in the equalizing ring or other supporting member 52. The supporting structure is centered by a bracket 53 which has a pair of springs 54 extending oppositely into engagement with the respective rockers 46. The arrangement of parts is such that one or the other of the springs is active in opposing the rocking movement of the system dependent on the direction in which the bearing is started.

The springs serve in conjunction with the thrust pressure—which has the same tendency by reason of the inclination of the guideways 45,—to keep the band 47 in tension.

Referring to Figure 8, the construction here shown constitutes still another form of the roller support for the longitudinally movable tilting shoe segments.

In this construction each two-part shoe is supported on a pair of roller elements 55, each of which comprises two cylindrical portions mounted on the opposite ends of the cross shafts 56 that are in turn journalled in the ends of a central cage bar or frame 57. The cylindrical roller members are supported on track or guide members 60, which are similar in form and arrangement to the corresponding members, 36, of the Figure 6 construction and engage oppositely-inclined tracks or guideways on the shoe members 39. The different parts of each segmental bearing unit are constrained to move in the proper rolling engagement with each other by two bars or pawls 59 that are pivoted at their centers to the forked extremities of the cage frame 57 and are engaged at their upper and lower ends respectively with the shoe member 39 and the stationary track or guide member 60.

In this case the upper portion of each cylindrical roller support 55—which engages with the lower beveled guideway of the shoe member 39—is shaped to form a short sector 22 that is of shorter radius than the roller support 55, and when the shoe surfaces roll in either direction on these sectors—while the rollers themselves roll in the same direction (at one-half the speed) on the track support 60—the lifting of the rear end of the shoe is diminished, and the lowering of the opposite advanced end of the segment is increased, with respect to the normal tilting movement obtained with truly cylindrical roller supports. This unsymmetrical rocking action results in a virtual lowering of the center of the thrust bearing surface of the shoe similar to that indicated in the diagram of Figure 2, and this action is the same for either direction of longitudinal movement of the bearing surface. With this construction I can therefore eliminate, or decrease to any extent desired, the upward lifting of the rearward end of the shoe members when the latter are moved to the position required to form the desired wedge-shaped oil films; and 1 can thereby attain the secondary object of my invention, viz., the diminution or minimization of the effect of the end thrust pressures in retarding or resisting the tangential tilting of the segmental bearing surfaces when the rotative movement begins.

In Figure 9 I have shown another form of rocking support for movable shoe segments which operates in substantially the same manner as the last described construction, the parts being so arranged that when each shoe member moves tangentially in the direction of rotation of the thrust collar, its rearward edge is lifted to a less extent than the forward edge is depressed. In the construction shown in Figure 9, this result is attained by supporting each two-part shoe on a pair of links 62, that are pivotally supported at their lower ends in blocks 63, on the leveling ring 16, and are pivotally mounted at their upper ends in blocks 61 on the lower member 30 of the composite shoe segment 18. As shown in this embodiment, the members of the shoe elements may be separated by bearing balls 30$^a$ or other rolling members to reduce the friction and facilitate the radial tilting of the upper shoe member on the lower.

These links 62 are inclined toward each other at a small angle, and each is provided with an inwardly extending arm 64 which is forked at its extremity, where it engages with a washer 65 that supports the lower end of a compression spring 66. The upper end of this spring is held in position by a nut on the bolt 67 which projects upwardly through the washer 65 from the leveling ring 16.

When the shoe segment moves in either direction from its normal position of rest, one end is lowered by the inward swinging movement of one of the supporting links 62, and the opposite end is lifted, but to a lesser extent, by the outward swinging movement of the other supporting link. This outward swinging movement of the rear link support lifts the inner end of its attached arm 64 and slightly compresses the spring 66. If the longitudinal axes of the links 62 are nearly vertical—or more generally stated if they are nearly perpendicular to the segment bearing surface—any longitudinal movement of the shoe member in either direction will result in very little, if any, lifting of the rear end of the shoe—the tilting of the segment being effected almost entirely by the inward swinging movement of the link support at the forward end of the shoe. In this case the return of the shoe to its normal untilted position—when the bearing comes to rest—is accomplished by the action of the spring 66 on the lifted end of the rear link arm 64. The action of the parts is the same regardless of the direction of movement of the opposed thrust member.

In the constructions thus far described each shoe segment is of a two-part construction, the upper element of the composite shoe being mounted to rock or tilt radially with respect to the lower element. In the construction shown in Figure 10 the necessity for dividing the shoe is eliminated by arranging and mounting the roller supports for the shoes in the manner previously illustrated in Figure 8, and providing each cylindrical portion of the roller members with coned extensions 68, that are turned toward each other and serve as the roller supporting elements for the longitudinally beveled and transversely curved lower face 31ª of the segment bearing member 30. In this case the radial rocking movement of the shoes is secured by the transverse sliding movement of the curved surfaces 31ª on the coned roller surfaces 68, while the tangential tilting movements of the said segments are secured, as before, by the longitudinal rolling movement of the shoe members on the cylindrical roller support system.

Referring to Figures 11 to 13 inclusive, the structure here shown comprises a plurality of one-piece shoes or bearing segments 71 which have bearing surfaces 72 cooperating with the bearing surface 36 of the thrust collar 14; and a series of supporting rollers 73 which in this arrangement are guided and relatively maintained in position by a single cage 74.

The cage comprises an inner ring 75, an outer ring 76, a plurality of radial webs 77, and adjustable studs 78 which constitute axial pivots for the rollers 73.

Each of the rollers has in general a frustoconical shape, being provided with end portions 79 of this form, but it is centrally enlarged into a spherically curved portion 80. The rollers are mounted on a beveled surface 81 of the base 82 which is annularly recessed at 83 to form a depression into which the spherical enlargement 80 of each roller extends without making contact, the frusto-conical portions 79 of the roller cooperating with the beveled annular surface 81 of the base.

Each of the bearing shoes 71 has oppositely inclined bottom surfaces 84 and 85 which are transversely curved, as clearly shown in Figure 11, to cooperate with the spherical portion 80 of the roller on which the shoe is supported. Each shoe is mounted on a pair of rollers and the inclination of the bottom surfaces 84 and 85 is such as to produce a lowering of the forward or leading end of the shoe and a raising of the trailing or following end. The transverse curvature of the inclined surfaces and the spherical formation of the central portions of the rollers enables the shoes to tilt radially and equalize the thrust pressure on the inner and outer zonal portions of the shoe surfaces.

Since the rollers are mounted on a single cage they are constrained to operate concurrently and they may be adjusted individually in a radial direction by adjustable bushings 86 which are screwed into the outer rings 76 of the cage and form bearings for the outer ends of the studs 78 as well as stops to limit the radially outward movement of the rollers.

The tendency of the thrust pressure by reason of the inclination of the base surface 81 is to force the rollers outwardly but the shoes are formed to fit loosely between the inner and outer cage rings and they are preferably provided with spherical lugs 87 which may engage the outer rings without interfering with the tilting of the shoes. The inner cage ring 75 is also preferably provided with similar spherical projections 88 which hold the shoes against radially inward movement without interfering with their tilting.

In order to equitably distribute the pressure between the different shoes the latter may be adjusted axially by moving the rollers radially on their axes by means of the adjusting studs 86 as already explained. A final automatic adjustment of any small differences of pressure upon the different shoes will be effected by a lateral movement of the cage and roller system as a whole on the inclined annular surface 81 of the base; such small movement being permissible without interfering with the true rolling movement between the cone roller supports and the supporting surface of the base.

In this construction—as in those previously described—it is desirable to provide means for preventing accidental displacement of the shoes with respect to their roller supports and for insuring at all times the true rolling movement of the parts on each other. This result is obtained by means of a plurality of locking tooth bars 89 which are pivotally mounted on the outer cage ring 76 by studs 90 and are provided at their upper and lower ends with suitably shaped toothed portions 91 which engage respectively with correspondingly shaped toothed recesses 92 and 93 in the lower faces of the shoes and in the upper face of the base.

Referring to Figures 14, 15 and 16, this construction differs from all of those previously described in having each roller member of the shoe support system arranged to jointly support the adjacent ends of contiguous shoe segments. This arrangement results, not only in a reduction in the number of roller supports, but also in a more direct and immediate cooperation in the action of the different shoes as they are moved circumferentially and simultaneously tilted in the direction of their movement.

In the form here shown, the rotatable member of the bearing is similar to that of the Figure 11 construction, the shaft being designated 12, the thrust block 13, and the thrust collar 14. Each of the bearing shoes is composed of an upper or bearing element 94 having a radially inclined bottom surface 95 which rests on and co-operates with a cylindrical rib 96 on the bottom or supporting element 97.

Each of the bottom or supporting elements is provided with an upwardly extending lug 98 at its inner edge and a downwardly extending lug 99 at its outer edge. A spring 100 is disposed in a notch 101 of the upper shoe element 94 and reacts upon the lug 98 in such manner that it tends to force the upper element radially outward and thus, by reason of the inclination of its bottom surface 95, to elevate said element. The thrust pressure is in this manner equitably distributed on the several shoes. Furthermore, each shoe element 94 is free to tilt in a radial direction on the cylindrical lug 96 so that a proper distribution of pressure is insured on the radial portions of the surface of each individual shoe.

The bottom surface of the lower or supporting element 97 is oppositely inclined from the center in a tangential direction as clearly shown in Figure 15; and these elements are provided with interlocking dovetailed or toothed projections 102 and 103 which serve to maintain the proper relation between the shoes and to insure their proper support on the common roller member that is positioned in operative relation to the adjacent ends of the shoes.

The base 104 is provided with a conically curved surface 105, on which the rolling support system for the shoes is mounted. This support system comprises a plurality of frusto-conical rollers 106 which are mounted on radial studs 107 of a roller cage composed of an inner ring 108 and an outer ring 109. The studs form axial pivots for the rollers and the radially outward movement of the rollers on the studs is determined by the adjustment of bushings 110 which correspond to the bushings 86 of Figure 11. The downwardly extending lugs 99 may be provided with spherical projections 111 which engage the outer ring 109 of the roller cage.

As clearly shown in Figures 15 and 16, the interlocking projections 102 and 103 of the lower shoe elements are supported directly on the frusto-conical rollers 106 and when the bearing is started in either direction the shoes roll on the conical supports 106 and are moved into a slightly tilted position by reason of the inclination of the bottom surface of each shoe, the operation of the bearing being similar to those already described.

In Figure 17, I have shown another means for supporting the adjacent ends of contiguous bearing shoes in such manner that the movement of the shoes in either direction will simultaneously and concurrently lift the rearward edge of one shoe and depress the adjacent forward edge of the next shoe.

In the form here shown the contiguous ends of adjacent shoes are mounted on rockers 112, each of the rockers being pivotally mounted on a radial pivot or pintle 113 mounted in a socket 114 in the bottom of a recess 115 of the base. The recess 115 has tangentially extending apertures 116 in which centering springs 117 are located and from which they extend into engagement with opposite sides of the rocker 112. The rocker is formed at the top into a pair of adjacent sockets 118 in which hardened balls or spheres 119 are seated. The radial edges of the shoes are provided with hardened blocks or inserts 120 having spherical sockets 121 which are adapted to engage the supporting spheres or balls 119.

The relative positions of the parts may be maintained without interfering with the tilting movements of the shoes by means of loose bolts 122 which extend through the enlarged top of the rocker 112 into the spheres 119 and loose bolts 123 which extend through suitable holes in the inserts 120 into the same spheres. The arrangement of parts is such that the shoes, although they are formed in one piece, are free to tilt radially on the balls 119, and when the bearing starts in either direction the shoes are carried circumferentially forward and cause the rockers 112 to tilt, thereby tilting the shoes on the balls 119 in such manner as to raise the rearward and lower the forward end of each shoe.

Another form of the one-piece shoe structure is shown in Figures 18, 19 and 20, like parts being designated by the same reference characters as in Figure 11. In this arrangement the base 125 is provided with a spherical surface 126 on which a cage ring 127 is mounted, the formation of the bottom surface of the cage ring and the arrangement of parts being such as to form a ball and socket joint.

The bearing further comprises a plurality of shoe elements or sectors 128 which have transversely curved bottom surfaces 129 and each of which is supported on a large central roller 130 and two relatively small end rollers 131. The large roller has a modified frusto-conical formation, its outer surface having a slightly concave end to end curvature so that the roller cooperates with the spherical surface 126 of the base. The transverse curvature of the bottom surface 129 of the shoe is of slightly shorter radius than the longitudinal curvature of the roller 130 and consequently the roller does not interfere with the radial tilting of the shoe on its support. The small rollers 131 have the form of balls or spheres and are located in planes that are disposed at substantially right angles to the axes of the large rollers— as best shown in Figure 19.

The cage ring 127 is provided with apertures 132 in which the larger rollers 130 are disposed, the arrangement being such that these rollers are mounted directly on the base 125 as clearly shown in Figure 18. The rolling elements 131 on the other hand, are mounted in oppositely inclined grooves 133 in the upper surface of the cage ring 127 (Fig. 20).

In order that the rollers 130 may not be displaced they are each provided with an upwardly extending toothed projection 134 which extends into a recess 135 in the bottom of the shoe and with a downwardly extending toothed projection 136 which extends into a recess 137 in the base. The spherical rollers 131 are similarly provided with upwardly extending toothed projections 138 which extend into suitable recesses 139 in the bottom surface of each shoe.

The inclined grooves 133 extend tangentially and the grooves for one set of shoe supporting balls 131 may join the grooves for the adjacent sets on each side, as clearly shown in Figure 19.

The large rollers must have a freedom of movement in the apertures 132 so that they can roll tangentially when the bearing starts to operate and they may have a lost motion radially and have their outward movement determined by adjusting screws 140.

In this arrangement the entire roller and cage ring supporting structure constitutes a levelling or equalizing collar or ring which automatically adjusts itself on the spherical seat 126 in such manner as to equitably distribute the thrust pressure over the series of bearing shoes of which the bearing is composed. Furthermore, the shoes are adapted to tilt individually in a radial direction to accomplish the zonal surface equalization as above described.

Referring now to Figures 21, 22 and 23, I have here shown still another embodiment of my invention in which the rotatable member of the bearing corresponds to that of Figure 11 and in which the relatively stationary member of the bearing constitutes a modification of the Figure 18 construction. The stationary base is designated 141 and has an annular channel 142 with a conically curved bottom surface 143 formed therein.

A plurality of cage sectors 144 are mounted in the annular channel 142 and are supported at their ends by rockers 145, each of the rockers supporting the adjacent ends of contiguous cage sectors as shown in Figure 23. The rockers 145 have conically curved bottom surfaces which engage the conical bottom surface 143 in the recess, the axis of curvature for the rockers being radial relative to the shaft of the bearing. The top surfaces of the rockers are provided with cylindrical lugs 146 on which the ends of the cage sectors are mounted. The cage structure in fact is composed of the sectors 144 and their supporting rockers 145 and constitutes an equalizing ring structure for uniformly distributing the pressure upon the bearing shoes 147 which are supported thereon.

The shoes are mounted directly on rolling elements 148 and 149, of which the elements 148 correspond to the larger rollers 130 of the Figure 18 construction but are spherically curved and are seated in recesses 150 in the cage sectors 144. The rolling elements 149 are like the elements 131 of the Figure 18 construction and are similarly mounted in oppositely inclined grooves 151 which extend tangentially relative to the shaft and are formed in the cage sectors.

The bottom surface of the shoes 147 may be provided with longitudinally curved grooves 152 to engage with the spherical roller elements 149; and, as shown, the shoes may be provided with hardened inserts 153 in which the grooves may be formed, as shown in Figures 21 and 23.

The entire annular system of flexibly connected cage sectors or blocks constitutes a ring equalizer system of the well known Kingsbury type and the complete assemblage of bearing shoes, roller supports, and ring equalizer members presents a simple and efficient construction in which the pressure is equitably distributed over the entire surface of bearing engagement, circumferentially by the flexible ring equalizer member, and radially by the transverse rocking or tilting of the individual shoes on the ball supports, and in which the tangential tilting movement of the bearing shoes is effected in accordance with the principles of my present invention, viz., in conjunction with and as a result of the initial tangential or circumferential rolling movement of the shoes in the direction of rotation of the cooperating thrust member.

It will therefore be perceived that I have provided a bearing of the type employing one or more tiltable bearing segments with supporting means for said segments whereby said segments are positively moved by the relative drag of the cooperating bearing surface thereon into inclined or tilted positions suitable for the immediate and automatic formation of wedge-shaped oil films between the bearing surfaces, whereby the starting friction between the bearing surfaces tends to facilitate rather than to hinder the formation of said films. At the same time I have provided supporting means for said segments whereby the movement of the opposed bearing member by the segments during tilting may be diminished to any desired extent to further minimize the opposition to tilting of said segments when the bearing starts from rest. When the bearing comes to rest, the segments, together with their rocking supporting means, return to neutral or intermediate position under the action of the thrust pressure or load, owing to the cooperation of the inclined supporting surfaces with the rocking supporting members, or the action of the springs on said members, or both. The segments are therefore always in position to be positively tilted by the action of the cooperating bearing surfaces each time the bearing is started in operation.

While I have herein referred, with reference to the direction of movement of the cooperating thrust member, to the "forward or leading" end of the shoe as being "lowered" and the "rear or trailing" end of the shoe as "raised," it will of course be understood that these expressions are accurate as applied to the vertical-shaft, relatively stationary shoe type of bearing such as is exemplified by the structures illustrated.

But the action of the shoes is always the same relatively to the body of oil in which they are immersed whether the bearing is of the vertical or horizontal type and whether the shoes are parts of the relatively stationary member of the bearing or of the relatively rotatable member of the bearing, and the operation may be more generally stated as follows: The radial edge of each shoe toward which oil approaches or tends to approach when the bearing is in operation is termed the "leading edge" and is moved axially in a direction away from the cooperating thrust member and the radial edge of each shoe from which oil tends to depart, is termed the "trailing edge" and is moved axially in a direction toward the cooperating thrust member.

The structures illustrated constitute not only embodiments of my present invention but involve various other novel features of structure and of operation which are covered and more fully explained in connection with copending applications. While several different constructions have been shown for purposes of illustration, my invention is not limited thereto, and I intend that only such limitations be imposed as are indicated in the appended claims. In said claims the term "rocking support" is to be construed as generic to any support that is capable of moving to and fro whether by rolling motion through a limited distance or by motion about an axis, and suitable for performing the purpose or purposes hereinbefore set forth.

What I claim is:

1. In a thrust bearing, the combination of one or more tiltable bearing shoes and a support for each shoe arranged to be operated by the shoe each time the bearing is started to positively tilt the shoe and establish an oil film at the surface thereof in response to a circumferential movement of the shoe due to the starting drag thereon.

2. In a thrust bearing, the combination of one or more tiltable bearing shoes and a support for each shoe operated by a circumferential movement of the shoe each time the bearing is started to effect a positive tilting of the shoe in a tangential direction consistent with the formation of an oil film at the surface thereof.

3. In a thrust bearing, the combination of relatively rotatable thrust members, one of which comprises one or more bearing shoes, and a movable support for each shoe operated each time the bearing is started to move the shoe to form a wedge-shaped oil film about an axis on the opposite side of the bearing surfaces from the point of shoe support.

4. In a bearing, relatively rotatable bearing members comprising one or more tiltable bearing segments and rocking means so mounting said segments that they are tilted to form wedge-shaped oil-films each time the bearing is started by the drag of the opposed bearing member thereon.

5. In a thrust bearing, the combination with a rotatable bearing member, of a relatively stationary bearing member, one of said members comprising a bearing segment having a cooperating bearing surface, and a rocking support for said segment so cooperating therewith that said segment has tilting movement about an axis on the opposite side of the bearing surfaces from said segment each time the bearing is started.

6. In a thrust bearing, the combination with a thrust collar having an annular bearing surface, of one or more bearing sectors or shoes having cooperating bearing surfaces, and rolling supports for the sectors or shoes arranged to so support said sectors or shoes that the latter have movement each time the bearing is started about axes materially beyond said cooperating bearing surfaces on the opposite side thereof.

7. A thrust bearing comprising a thrust collar, one or more cooperating thrust sectors or shoes having their rear surfaces oppositely inclined in a tangential direction, a support, and rolling elements interposed between and cooperating with said support and the respective inclined shoe surfaces.

8. A thrust bearing comprising a thrust collar, one or more cooperating thrust sectors or shoes having their rear surfaces oppositely inclined in a tangential direction, a support, rolling elements interposed between and cooperating with said support and the respective inclined shoe surfaces, and a frame for holding the rolling elements for each shoe in spaced relation.

9. A thrust bearing comprising a thrust collar, one or more cooperating thrust sectors or shoes having their rear surfaces oppositely inclined in a tangential direction, a support, rolling elements interposed between and cooperating with said support and the respective inclined shoe surfaces, a frame for holding the rolling elements for each shoe in spaced relation, and means for maintaining the rolling elements in operative position.

10. A thrust bearing comprising a thrust collar, one or more cooperating thrust sectors or shoes having their rear surfaces oppositely inclined in a tangential direction, a support, rolling elements interposed between and cooperating with said support and the respective inclined shoe surfaces, a frame for holding the rolling elements for each shoe in spaced relation, and means for interconnecting the frames of the several shoes.

11. A thrust bearing comprising a thrust collar, one or more cooperating thrust sectors or shoes having their rear surfaces oppositely inclined in a tangential direction, a support, rolling elements interposed between and cooperating with said support and the respective inclined shoe surfaces, a frame for holding the rolling elements for each shoe in spaced relation, means for maintaining the rolling elements in operative position, and means for interconnecting the frames of the several shoes.

12. A thrust bearing comprising a thrust collar, one or more cooperating thrust sectors or shoes having their rear surfaces oppositely inclined in a tangential direction, a support, rolling elements interposed between said support and the respective inclined shoe surfaces, a frame for holding the rolling elements for each shoe in spaced relation, and links for coupling the frames of the several shoes together.

13. A thrust bearing comprising a thrust collar, one or more cooperating thrust sectors or shoes having their rear surfaces oppositely inclined in a tangential direction, a support, rolling elements interposed between said support and the respective inclined shoe surfaces, a frame for holding the rolling elements for each shoe in spaced relation, and means pivotally mounted on each frame and cooperating with the associated shoe and support to maintain the elements in operative position.

14. A thrust bearing comprising a thrust collar, one or more cooperating thrust sectors or shoes having their rear surfaces oppositely inclined in a tangential direction, a support having a guideway, and a pair of rollers in said guideway arranged to cooperate with the inclined surfaces of each of the shoes.

15. A thrust bearing comprising a thrust collar, one or more cooperating thrust sectors or shoes having their rear surfaces oppositely inclined in a tangential direction, a support having a guideway, a pair of rollers in said guideway arranged to cooperate with the inclined surfaces of each of the shoes, and means for maintaining each pair of rollers in position.

16. A thrust bearing comprising a thrust collar, one or more cooperating thrust sectors or shoes having their rear surfaces oppositely inclined in a tangential direction, a support having a guideway, a pair of rollers in said guideway arranged to cooperate with the inclined surfaces of each of the shoes, and a frame pivotally mounting the rollers and adapted to maintain the relative positions of the rollers.

17. A thrust bearing comprising a thrust collar, one or more cooperating thrust sectors or shoes having their rear surfaces oppositely inclined in a tangential direction, a support having a guideway, a pair of rollers in said guideway arranged to cooperate with the inclined surfaces of each of the shoes, a frame pivotally mounting the rollers and adapted to maintain the relative positions of the rollers, and links connecting the roller frames for the several shoes.

18. A thrust bearing comprising a thrust collar, one or more cooperating thrust sectors or shoes having their rear surfaces oppositely inclined in a tangential direction, a support having a guideway, a pair of rollers in said guideway arranged to cooperate with the inclined surfaces of each of the shoes, a frame pivotally mounting the rollers and adapted to maintain the relative positions of the rollers, and means for maintaining the rolling elements in operative position.

19. In a bearing, relatively rotatable bearing members comprising one or more tiltable bearing segments having their respective rear surfaces oppositely inclined in tangential directions, a support, and rolling elements interposed between said support and segments and simultaneously cooperating with both inclined surfaces of each segment.

20. A thrust bearing comprising a thrust collar, one or more cooperating thrust sectors or shoes each composed of a supporting member having its rear surface oppositely inclined in a tangential direction and a surface member mounted thereon and arranged for radial tilting, a support, and rolling elements interposed between the support and the respective inclined shoe surfaces.

21. In a bearing, relatively rotatable bearing members comprising one or more tiltable bearing segments and rocking means mounting the respective segments and cooperating therewith so that said segments are tilted by the drag of the opposed bearing member thereon and simultaneously moved axially with respect to said member.

22. A thrust bearing comprising a thrust collar, one or more cooperating thrust sectors or shoes having their rear surfaces oppositely inclined in a tangential direction, an equalizing support, and rolling elements interposed between and cooperating with said support and the respective inclined shoe surfaces.

23. A thrust bearing comprising a thrust collar, one or more cooperating thrust sectors or shoes having their rear surfaces oppositely inclined in a tangential direction, a supporting member having oppositely inclined surfaces opposed to the surfaces of said shoes, and interposed rolling members engaging the opposed inclined surfaces.

24. In a bearing, the combination of one or more tiltable bearing segments and a support for said segments operated thereby each time the bearing is started to effect a tilting of said segments and the establishment of oil films at the bearing surfaces thereof in response to the starting drag of the opposed bearing surface on said segments.

25. In a bearing, relatively rotatable bearing members one of which comprises one or more tiltable bearing segments and rocking supports therefor operated by the segments whereby the same are movable about axes on the opposite side of the bearing surfaces from said segments each time the bearing is started.

26. In a bearing, relatively rotatable bearing members one of which comprises one or more tiltable bearing segments having their respective rear surfaces oppositely inclined in tangential directions, and rocking elements cooperating with the respective inclined surfaces.

27. In a bearing, relatively rotatable members one of which comprises one or more tiltable bearing segments having their respective rear surfaces oppositely inclined in tangential directions, and movable mounting members operated by said segments and cooperating with said respective inclined surfaces to permit said segments to move with the opposed bearing member and to tilt with respect thereto.

28. In a bearing, relatively rotatable members one of which comprises one or more tiltable bearing segments having their respective rear surfaces oppositely inclined in tangential directions, and movable mounting members provided with cylindrical surfaces cooperating with said respective inclined surfaces.

29. In a bearing, relatively rotatable members one of which comprises one or more tiltable bearing segments having their respective rear surfaces oppositely inclined in tangential directions, rockable mounting members cooperating with said respective inclined surfaces, and means for maintaining said mounting members in operative position.

30. In a bearing, relatively rotatable bearing members one of which comprises one or more tiltable bearing segments, a support, and rolling elements interposed between said support and the respective bearing segments, each of said rolling elements having a portion of one curvature cooperating with the support and a portion of different curvature cooperating with the corresponding bearing segment.

31. In a bearing, relatively rotatable bearing members one of which comprises one or more tiltable bearing segments having their respective rear surfaces oppositely inclined in tangential directions, and rolling elements mounting said bearing segments and having portions of shorter radius of curvature cooperating with said respective inclined surfaces.

32. In a bearing, relatively rotatable bearing members one of which comprises one or more tiltable bearing segments, and mounting means cooperating with each segment so that the same is positively tilted by the starting action of the opposed bearing member and upon tilting movement thereof its leading edge is moved away from the opposed bearing member without a corresponding movement of its trailing edge toward said member.

33. In a bearing, relatively rotatable bearing members one of which comprises one or more tiltable bearing segments, and movable mounting means cooperating with each segment and operated thereby to cause the segment to tilt under the starting action of the opposed bearing member but by unequal amounts at its forward and rear edges.

34. In a bearing, relatively rotatable bearing members one of which comprises one or more tiltable bearing segments, and rocking mounting means cooperating with each segment and operated by the starting action of the opposed bearing member on said segment to cause positive tilting of the latter to a greater extent at its leading edge than at its trailing edge.

35. In a bearing, relatively rotatable bearing members one of which comprises one or more tiltable bearing segments having their respective rear surfaces oppositely inclined in tangential directions, and mounting means cooperating with said inclined surfaces to permit unequal tilting of the forward and rear edges of the respective bearing segments.

36. A thrust bearing comprising one or more tiltable bearing shoes, each having an oppositely inclined rear surface, a support, and rolling elements interposed between said support and the respective inclined surfaces, each of said rolling elements having a portion of one curvature cooperating with the support and a portion of different curvature cooperating with one of the oppositely inclined shoe surfaces.

37. A thrust bearing comprising one or more tiltable bearing shoes, each having an oppositely inclined rear surface, a support having oppositely inclined grooves formed therein, and rolling elements for each shoe mounted in the inclined grooves of the support and having portions of shorter radius cooperating with the respective inclined surfaces of the corresponding shoe.

38. A thrust bearing comprising one or more tiltable bearing shoes, each having an oppositely inclined rear surface, a support having oppositely inclined grooves formed therein, rollers for each shoe, and a frame in which the rollers are axially pivoted, said rollers being mounted in the inclined grooves of the support and having portions of shorter radius cooperating with the respective inclined surfaces of the corresponding shoe.

39. A thrust bearing comprising one or more tiltable bearing shoes, each having an oppositely inclined rear surface, a support having oppositely inclined grooves formed therein, rollers for each shoe, a frame in which the rollers are axially pivoted, and means for maintaining said rollers in operative position, each of said rollers having a portion of one curvature cooperating with one of the inclined grooves of the support and a portion of different curvature cooperating with one of the oppositely inclined surfaces of the shoe.

40. A thrust bearing comprising a rotatable thrust member, one or more cooperating thrust sectors or shoes having their rear surfaces oppositely inclined in a tangential direction, and rollers arranged to engage the oppositely inclined surfaces of the shoes and to equalize the thrust pressure among the shoes.

41. A thrust bearing comprising a rotatable thrust member, one or more cooperating thrust sectors or shoes having their rear surfaces oppositely inclined in a tangential direction, rollers arranged to engage the oppositely inclined surfaces of the shoes and to equalize the thrust pressure among the shoes, and means for maintaining the rollers in spaced relation.

42. In a thrust bearing, the combination of relatively rotatable thrust members, of which one comprises one or more tiltable bearing shoes or sectors, and supporting means for each shoe or sector arranged to allow the shoe or sector to move axially in a direction away from the cooperating thrust member at starting.

43. In a thrust bearing, the combination of relatively rotatable thrust members, of which one comprises one or more tiltable bearing shoes or sectors, and supporting means for each shoe or sector arranged to allow the shoe or sector to move axially and tangentially at starting.

44. In a thrust bearing, the combination of relatively rotatable thrust members, of which one comprises one or more tiltable bearing shoes or sectors, and movable supporting means for each shoe or sector operated thereby and arranged to cause the leading end of each shoe to move axially away from the cooperating thrust member at starting.

45. In a thrust bearing, the combination of relatively rotatable thrust members, of which one comprises one or more tiltable bearing shoes or sectors, and supporting means for each shoe or sector arranged to cause the leading end of each shoe to move axially away from the cooperating thrust member without moving the trailing end of the shoe in the opposite direction.

46. In a thrust bearing, the combination of relatively rotatable thrust members, of which one comprises one or more tiltable bearing shoes or sectors, and supporting means for each shoe or sector arranged to produce a tilting and an axial movement of the shoe in response to a tangential movement thereof.

47. In a thrust bearing, the combination of relatively rotatable thrust members, of which one comprises one or more tiltable bearing shoes or sectors, and supporting means for each shoe or sector arranged to produce a tilting and an axial movement of the shoe in response to the tangential movement thereof due to the drag between the cooperating thrust members at starting.

48. In a thrust bearing, the combination of relatively rotatable thrust members, of which one comprises one or more tiltable bearing shoes or sectors, and supporting means for each shoe or sector arranged to cause the leading end of each shoe to move axially away from the cooperating thrust member at starting without moving the trailing end of the shoe an equal amount in the opposite direction.

49. In a bearing, relatively rotatable bearing members comprising one or more tiltable bearing segments, and means mounting said segments and operated thereby whereby said segments are movable through a limited distance with the opposed bearing member in either direction of rotation and are positively tilted with respect to said member by said movement to form wedge-shaped oil films.

50. In a bearing, relatively rotatable bearing members comprising one or more tiltable bearing segments, and means mounting said segments and operated thereby whereby said segments are tilted to form wedge-shaped oil films by the drag thereon of the opposed bearing member in either direction of rotation.

51. In a bearing, relatively rotatable bearing members comprising one or more tiltable bearing segments, and means mounting said segments whereby they are moved axially and tilted to form wedge-shaped oil films by the drag thereon of the opposed bearing member.

52. In a bearing, relatively rotatable bearing members comprising one or more tiltable bearing segments, and means mounting said segments whereby they are moved through a limited distance with the opposed bearing member and simultaneously moved axially and tilted to form wedge-shaped oil films by the drag on said segments of said opposed bearing member.

53. In a bearing, relatively rotatable bearing members comprising one or more tiltable bearing segments, said segments having their respective rear surfaces oppositely inclined in tangential directions, and mounting members adapted to rock in either direction cooperating with the inclined surfaces of said segments.

54. In a bearing, relatively rotatable bearing members comprising one or more tiltable bearing segments, said segments having their respective rear surfaces oppositely inclined in tangential directions, and rocking members cooperating with the inclined surfaces of said segments.

55. In a bearing, relatively rotatable bearing members comprising one or more tiltable bearing segments, said segments having their respective rear surfaces oppositely inclined in tangential directions, rockers cooperating with the inclined surfaces of said segments, and means for maintaining said rockers in operative position.

56. In a bearing, relatively rotatable bearing members comprising one or more bearing shoes, each comprising a supporting portion and a bearing portion radially tiltable on said supporting portion, and mounting means for said shoes whereby they are tilted to form wedge-shaped oil films by the drag thereon of the opposed bearing member.

57. In a bearing, relatively rotatable bearing members comprising one or more bearing segments having their respective rear surfaces oppositely inclined in tangential directions, rolling elements cooperating with said inclined surfaces, means for maintaining said rolling elements in spaced relation, and one or more pawls for maintaining said rolling elements in operative position.

58. In a bearing, relatively rotatable bearing members comprising one or more bearing segments having their respective rear surfaces oppositely inclined in tangential directions, rolling elements cooperating with said inclined surfaces, a support, a frame for maintaining said rolling elements in spaced relation, and one or more pawls pivotally mounted on said frame and coacting with recesses in said segments and support for maintaining said rolling elements in operative position.

59. In a bearing, relatively rotatable bearing members comprising one or more tiltable bearing segments and rolling supports for said segments so cooperating therewith that the segments are tilted by the action thereon of the opposed bearing member each time the bearing is started to form wedge-shaped openings between the bearing surfaces.

60. In a bearing, one or more bearing segments having their respective rear faces oppositely inclined in tangential directions, a support having oppositely inclined surfaces opposed to said inclined surfaces of the segments, and rolling elements cooperating with said opposed inclined surfaces.

61. In a bearing, one or more bearing segments, a support, and rolling elements interposed between said segments and support and having surfaces of different curvature cooperating with said segments and said support.

62. In a bearing, one or more bearing segments, a support, and a pair of mounting members interposed between each segment and said support, each pair of said mounting members simultaneously coacting with its segment so that the same has unequal tilting movements at its forward and rear edges.

63. In a bearing, one or more bearing segments, and rolling elements mounting said segments to tilt radially and to move and tilt tangentially in response to the drag thereon of the opposed bearing surface.

64. In a bearing, one or more bearing segments mounted to be moved through a limited distance by the drag of the opposed bearing surface thereon, and movable means mounting said segments whereby said movment tilts the segments in the proper direction for establishing a wedge-shaped oil film each time the bearing is started.

65. In a bearing, one or more bearing segments mounted to be moved through a limited distance by the drag of the opposed bearing surface thereon, and means mounting said segments whereby said movement tilts the segments in the proper direction for establishing a wedge-shaped oil film concurrently with an axial movement of the segments away from the opposed bearing surface.

66. In a bearing, relatively rotatable bearing members comprising one or more tiltable bearing segments and rolling supports for said segments so cooperating therewith that the segments are tilted by the action thereon of the opposed bearing member and simultaneously moved axially with respect to said member to form wedge-shaped openings between the bearing surfaces.

67. In a bearing, relatively rotatable bearing members comprising one or more tiltable bearing segments having their respective rear surfaces oppositely inclined in tangential directions but at a relatively small angle to the plane of bearing engagement, and supporting means cooperating with the inclined surfaces of each of said segments.

68. In a bearing, relatively rotatable bearing members including one or more tiltable bearing segments and rocking means supporting the same and cooperating therewith so that said segments are tilted to form wedge-shaped openings between the bearing surfaces by the drag of the opposed bearing member thereon.

69. In a bearing, relatively rotatable bearing members including one or more tiltable bearing segments having their respective rear surfaces oppositely inclined in tangential directions, and rocking members cooperating with said inclined surfaces and on which said segments are radially tiltable.

70. In a bearing, relatively rotatable bearing members including one or more tiltable bearing segments, and means mounting said segments whereby they assume positions parallel to the opposed bearing member when the bearing is at rest and are tilted by the drag of the opposed bearing member thereon in the direction proper for the automatic formation of oil films when the bearing is started.

71. In a bearing, relatively rotatable bearing members including one or more tiltable bearing segments, and means mounting said segments and movable under the influence of the starting drag on said segments to tilt said segments in the direction proper for the automatic formation of oil-films, said mounting means restoring said segments to a neutral or intermediate position when the bearing is at rest.

In witness whereof, I have hereunto set my hand this 14th day of June, 1918.

FRANK L. O. WADSWORTH.